US012555426B2

United States Patent
Song et al.

(10) Patent No.: US 12,555,426 B2
(45) Date of Patent: Feb. 17, 2026

(54) DEVICE MANAGEMENT SYSTEM, METHOD AND APPARATUS

(71) Applicant: HEMA (CHINA) CO., LTD., Shanghai (CN)

(72) Inventors: Enliang Song, Shanghai (CN); Zhenyu Zhao, Shanghai (CN); Jun Jiang, Hangzhou (CN); Zhenxiang Zhu, Hangzhou (CN); Yimin Wu, Shanghai (CN); Zhikun Han, Shanghai (CN); Danyang Chen, Shanghai (CN); Mengfan Liu, Hangzhou (CN)

(73) Assignee: HEMA (CHINA) CO., LTD., Shanghai (CN)

( * ) Notice: Subject to any disclaimer, the term of this patent is extended or adjusted under 35 U.S.C. 154(b) by 88 days.

(21) Appl. No.: 18/712,201

(22) PCT Filed: Sep. 29, 2022

(86) PCT No.: PCT/CN2022/122893
§ 371 (c)(1),
(2) Date: May 21, 2024

(87) PCT Pub. No.: WO2023/093299
PCT Pub. Date: Jun. 1, 2023

(65) Prior Publication Data
US 2024/0412578 A1 Dec. 12, 2024

(30) Foreign Application Priority Data
Nov. 23, 2021 (CN) .......................... 202111396413.2

(51) Int. Cl.
*G07C 9/00* (2020.01)
*G07C 9/20* (2020.01)
*G06V 40/16* (2022.01)

(52) U.S. Cl.
CPC ........... *G07C 9/00309* (2013.01); *G07C 9/20* (2020.01); *G06V 40/172* (2022.01)

(58) Field of Classification Search
CPC .. G07C 9/00309; G07C 9/20; G07C 9/00563; G07C 9/00571; G07C 2009/00769;
(Continued)

(56) References Cited

U.S. PATENT DOCUMENTS

| 2013/0027183 A1 | 1/2013 | Wu et al. |
| 2015/0123468 A1 | 5/2015 | Wu et al. |

(Continued)

FOREIGN PATENT DOCUMENTS

| CN | 203339752 U | 12/2013 |
| CN | 107331013 A | 11/2017 |

(Continued)

OTHER PUBLICATIONS

International Search Report including English-language translation for PCT/CN2022/122893 dated Nov. 25, 2022 (7 pages).

(Continued)

*Primary Examiner* — An T Nguyen
(74) *Attorney, Agent, or Firm* — Clark Hill PLC

(57) ABSTRACT

A device management system, method and apparatus are disclosed. The device management method comprises: sending, in response to a borrow and return request, an unlocking instruction to an electromagnetic lock configured for a device management cabinet, wherein the electromagnetic lock unlocks the device management cabinet in response to the unlocking instruction; receiving charging state information of a target device storage unit that is returned by the device management cabinet, wherein said device is stored in the target device storage unit; receiving lock state data of the device management cabinet that is sent by the electromagnetic lock, and acquiring electric quantity state information (Continued)

of said device; and generating, according to the charging state information, the electric quantity state information and the lock state data, borrow and return information of said device.

20 Claims, 5 Drawing Sheets

(58) Field of Classification Search
CPC .............. G07C 9/00896; G06V 40/172; G06Q 20/202; G06Q 20/322; G06Q 20/4014; G06Q 20/40145; G06Q 30/0645; G07F 15/006; G07F 17/12; G07G 1/0081; H02J 7/00034; H02J 7/0044
See application file for complete search history.

(56) References Cited

U.S. PATENT DOCUMENTS

| | | | |
|---|---|---|---|
| 2016/0142483 A1 | 5/2016 | Nallathambi et al. | |
| 2019/0088053 A1 | 3/2019 | Lee et al. | |
| 2021/0335079 A1* | 10/2021 | Zhang | G07F 17/0021 |
| 2023/0080952 A1* | 3/2023 | Okawa | B60L 53/80 |
| | | | 320/107 |
| 2023/0260014 A1* | 8/2023 | Mizuta | G06Q 30/0645 |
| | | | 705/307 |

FOREIGN PATENT DOCUMENTS

| | | |
|---|---|---|
| CN | 107864433 A | 3/2018 |
| CN | 107895433 A | 4/2018 |
| CN | 108022374 A | 5/2018 |
| CN | 108199451 A | 6/2018 |
| CN | 112085894 A | 12/2020 |
| CN | 112509188 A | 3/2021 |
| CN | 112669531 A | 4/2021 |
| CN | 114359995 A | 4/2022 |

OTHER PUBLICATIONS

First Chinese Office Action issued Jan. 18, 2025 in CN Application No. 202111396413.2 entitled "Equipment Management System, method and device" (15 pages including an English-language translation of the Office Action).

Extended European Search Report of European Patent Application No. 22897384.8 based on PCT/CN2022/122893, dated Oct. 23, 2025 (8 pages).

* cited by examiner

DEVICE MANAGEMENT SYSTEM, METHOD AND APPARATUS

This is an application under 35 U.S.C. § 371 of International Application No. PCT/CN2022/122893 filed Sep. 29, 2022, and entitled "DEVICE MANAGEMENT SYSTEM, METHOD AND APPARATUS", which claims priority to Chinese patent application No. 202111396413.2, filed with the China Patent Office on Nov. 23, 2021, and entitled "DEVICE MANAGEMENT SYSTEM, METHOD AND APPARATUS", both applications being incorporated herein by reference in their entireties.

TECHNICAL FIELD

Embodiments of the present disclosure relate to the field of computer technologies, and in particular, to a device management system, method and apparatus.

BACKGROUND

Under the "New Retailing" service mode, a service provider (which may be called a retailer or merchant in practical applications) may open an offline physical store, and consumer users may directly go to the offline physical store to buy commodity objects. At the same time, the service provider may also provide an online store corresponding to the physical store through an online application (App), and display to the users through the online store the relevant information of commodity objects that can be provided in the physical store, for the users to place an order.

SUMMARY

Embodiments of the present disclosure provide a device management method. One or more embodiments of the present disclosure also relate to a device management system, a device management apparatus, a computing device, a computer-readable storage medium, and a computer program.

According to a first aspect of the embodiments of the present specification, there is provided a device management system, including:
 a device management cabinet and a client, wherein the device management cabinet includes an electromagnetic lock, and the device management cabinet, the electromagnetic lock and the client are in communication connection with each other through Bluetooth;
 the electromagnetic lock is configured to unlock or lock the device management cabinet in response to an unlocking instruction or a locking instruction, and send lock state data of the device management cabinet to the client;
 the device management cabinet is configured to detect, in an unlocked state, charging state information of a target device storage unit of a plurality of device storage units, and send the charging state information to the client; and
 the client is configured to acquire electric quantity state information of a device to be managed, and generate borrow and return information of the device to be managed according to the charging state information, the electric quantity state information and the lock state data, wherein the device to be managed is stored in the target device storage unit.

According to a second aspect of the embodiments of the present specification, there is provided a first device management method, applied to a client, including:
 sending, in response to a borrow and return request for a device to be managed submitted by a user, an unlocking instruction to an electromagnetic lock configured for a device management cabinet, wherein the electromagnetic lock unlocks the device management cabinet in response to the unlocking instruction;
 receiving charging state information of a target device storage unit that is returned by the device management cabinet, wherein the target device storage unit is at least one of a plurality of device storage units in the device management cabinet, and the device to be managed is stored in the target device storage unit;
 receiving lock state data of the device management cabinet that is sent by the electromagnetic lock, and acquiring electric quantity state information of the device to be managed; and
 generating, according to the charging state information, the electric quantity state information and the lock state data, borrow and return information of the device to be managed.

Optionally, acquiring the electric quantity state information of the device to be managed includes:
 acquiring the electric quantity state information of the device to be managed that is returned by a cloud service platform, wherein the electric quantity state information is sent by the device to be managed to the cloud service platform.

Optionally, before sending, in response to the borrow and return request for the device to be managed submitted by the user, the unlocking instruction to the electromagnetic lock configured for the device management cabinet, the method further including:
 evaluating at least one device to be managed in the device management cabinet that meets a borrow condition, determining a device storage unit in which the at least one device to be managed is located, and establishing a first Bluetooth communication link with the device storage unit;
 evaluating at least one device storage unit in the device management cabinet that meets a return condition for the device to be managed, and establishing a second Bluetooth communication link with the at least one device storage unit; and
 establishing a third Bluetooth communication link with the electromagnetic lock, wherein the first Bluetooth communication link, the second Bluetooth communication link and the third Bluetooth communication link serve as a Bluetooth main link between the client and the device management cabinet.

Optionally, receiving the charging state information of the target device storage unit that is returned by the device management cabinet includes:
 receiving the charging state information of the target device storage unit that is returned by the device management cabinet through the first Bluetooth communication link or the second Bluetooth communication link; and
 correspondingly, receiving the lock state data of the device management cabinet that is sent by the electromagnetic lock includes:
 receiving the lock state data of the device management cabinet that is sent by the electromagnetic lock through the third Bluetooth communication link.

Optionally, sending, in response to the borrow and return request for the device to be managed submitted by the user, the unlocking instruction to the electromagnetic lock configured for the device management cabinet includes:

sending, in response to a borrow request for the device to be managed submitted by the user, the unlocking instruction to the electromagnetic lock configured for the device management cabinet, and disconnecting the second Bluetooth communication link with the at least one device storage unit; or sending, in response to a return request for the device to be managed submitted by the user, the unlocking instruction to the electromagnetic lock configured for the device management cabinet, and disconnecting the first Bluetooth communication link established with the device storage unit.

Optionally, the device management method further includes:

sampling through the Bluetooth main link according to a preset data sampling interval to acquire charging state information of respective device storage units in the device management cabinet, charging state information of a device to be managed in the respective device storage units, and lock state data of the electromagnetic lock, in a case that the device management cabinet is in a locked state;

determining whether an acquisition result of the charging state information of the respective device storage units, the charging state information of the device to be managed in the respective device storage units, and the lock state data of the electromagnetic lock meets a preset acquisition condition; and disconnecting the Bluetooth main link, and acquiring, through a Bluetooth auxiliary link, charging state information of the respective device storage units in the device management cabinet, charging state information of the device to be managed in the respective device storage units, and lock state data of the electromagnetic lock, if the acquisition result of the charging state information of the respective device storage units, the charging state information of the device to be managed in the respective device storage units, and the lock state data of the electromagnetic lock does not meet the preset acquisition condition.

Optionally, the device management method further includes:

establishing a fourth Bluetooth communication link between the target device to be managed and the respective device storage units in the device management cabinet, and establishing a fifth Bluetooth communication link between the target device to be managed and the electromagnetic lock, the fourth Bluetooth communication link, the fifth Bluetooth communication link, a communication link between the target device to be managed and the cloud service platform, and a communication link between the cloud service platform and the client together forming the Bluetooth auxiliary link.

Optionally, acquiring, through the Bluetooth auxiliary link, the charging state information of the respective device storage units in the device management cabinet, the charging state information of the device to be managed in the respective device storage units, and the lock state data of the electromagnetic lock includes:

acquiring, through the communication link between the cloud service platform and the client, the charging state information of the respective device storage unit in the device management cabinet, the charging state information of the device to be managed in the respective device storage units, and the lock state data of the electromagnetic lock;

wherein the charging state information of the respective device storage units is transmitted to the target device to be managed by the respective device storage units through the fourth Bluetooth communication link, the lock state data is sent to the target device to be managed by the electromagnetic lock through the fifth Bluetooth communication link, and the target device to be managed sends the charging state information of the respective device storage units in the device management cabinet, the charging state information of the device to be managed in the respective device storage units, and the lock state data of the electromagnetic lock to the client through the communication link with the cloud service platform and the communication link between the cloud service platform and the client.

Optionally, establishing the fourth Bluetooth communication link between the target device to be managed and the respective device storage units in the device management cabinet includes:

determining an electric quantity of a device to be managed in the respective device storage units in the device management cabinet, and taking a device to be managed that has an electric quantity lower than a preset electric quantity threshold as the target device to be managed; and establishing the fourth Bluetooth communication link between the target device to be managed and the respective device storage unit in the device management cabinet.

Optionally, before sending the unlocking instruction to the electromagnetic lock configured for the device management cabinet, the method further includes:

calling an image collection component to collect a face image of the user and performing identity recognition on the user based on a collection result; and executing the step of sending the unlocking instruction to the electromagnetic lock configured for the device management cabinet, in a case of determining, according to an identity recognition result, that the user meets a borrow and return condition.

Optionally, before sending the unlocking instruction to the electromagnetic lock configured for the device management cabinet, the method further includes:

acquiring login information of the user associated with the client, and executing the step of sending the unlocking instruction to the electromagnetic lock configured for the device management cabinet, in a case of determining, according to the login information, that the user meets a borrow and return condition.

Optionally, generating, according to the charging state information, the electric quantity state information and the lock state data, the borrow and return information of the device to be managed includes:

comparing the charging state information with the electric quantity state information, in a case of determining, according to the lock state data, that the device management cabinet is in the locked state; and generating borrow information or return information of the device to be managed in a case of a consistent comparison result.

Optionally, generating, according to the charging state information, the electric quantity state information and the lock state data, the borrow and return information of the device to be managed includes:

acquiring acceleration data of the device to be managed, in a case of determining, according to the lock state data, that the device management cabinet is in the locked state;

comparing the charging state information with the electric quantity state information, in a case of determining, according to the acceleration data, that the device to be managed is in a static state; and generating return information of the device to be managed in a case of a consistent comparison result.

According to a third aspect of the embodiments of the present specification, there is provided a first device management apparatus, applied to a client, including:

a sending module configured to send, in response to a borrow and return request for a device to be managed submitted by a user, an unlocking instruction to an electromagnetic lock configured for a device management cabinet, wherein the electromagnetic lock unlocks the device management cabinet in response to the unlocking instruction;

a receiving module configured to receive charging state information of a target device storage unit that is returned by the device management cabinet, wherein the target device storage unit is at least one of a plurality of device storage units in the device management cabinet, and the device to be managed is stored in the target device storage unit;

an acquisition module configured to receive lock state data of the device management cabinet that is sent by the electromagnetic lock, and acquire electric quantity state information of the device to be managed; and a generation module configured to generate borrow and return information of the device to be managed according to the charging state information, the electric quantity state information and the lock state data.

According to a fourth aspect of the embodiments of the present specification, there is provided a second device management method, applied to a device management cabinet with an electromagnetic lock, including:

unlocking the device management cabinet by the electromagnetic lock in response to an unlocking instruction;

detecting, by the device management cabinet in an unlocked state, charging state information of a target device storage unit of a plurality of device storage units, and sending the charging state information to a client; and locking the device management cabinet by the electromagnetic lock in response to a locking instruction, and sending lock state data of the device management cabinet to the client, wherein the client acquires electric quantity state information of a device to be managed, and generates borrow and return information of the device to be managed according to the charging state information, the electric quantity state information and the lock state data, and the device to be managed is stored in the target device storage unit.

According to a fifth aspect of the embodiments of the present specification, there is provided a second device management apparatus, applied to a device management cabinet with an electromagnetic lock, including:

an unlocking module configured to enable unlocking the device management cabinet by the electromagnetic lock in response to an unlocking instruction;

a detection module configured to enable detecting, by the device management cabinet in an unlocked state, charging state information of a target device storage unit of a plurality of device storage units, and sending the charging state information to a client; and a sending module configured to enable locking the device management cabinet by the electromagnetic lock in response to a locking instruction, and sending lock state data of the device management cabinet to the client, wherein the client acquires electric quantity state information of a device to be managed, and generates borrow and return information of the device to be managed according to the charging state information, the electric quantity state information and the lock state data, and the device to be managed is stored in the target device storage unit.

According to a sixth aspect of the embodiments of the present specification, there is provided a computing device, including:

a memory and a processor;

the memory is used for storing computer-executable instructions, and the processor is, when executing the computer-executable instructions, used for implementing the steps of any one of the device management methods.

According to a seventh aspect of the embodiments of the present specification, there is provided a computer-readable storage medium, which stores computer-executable instructions that, when executed by a processor, implement the steps of any one of the device management methods.

According to an eighth aspect of the embodiments of the present specification, there is provided a computer program, which, when executed in a computer, causes the computer to execute the steps of the device management methods described above.

DETAILED DESCRIPTION

Figure 1:
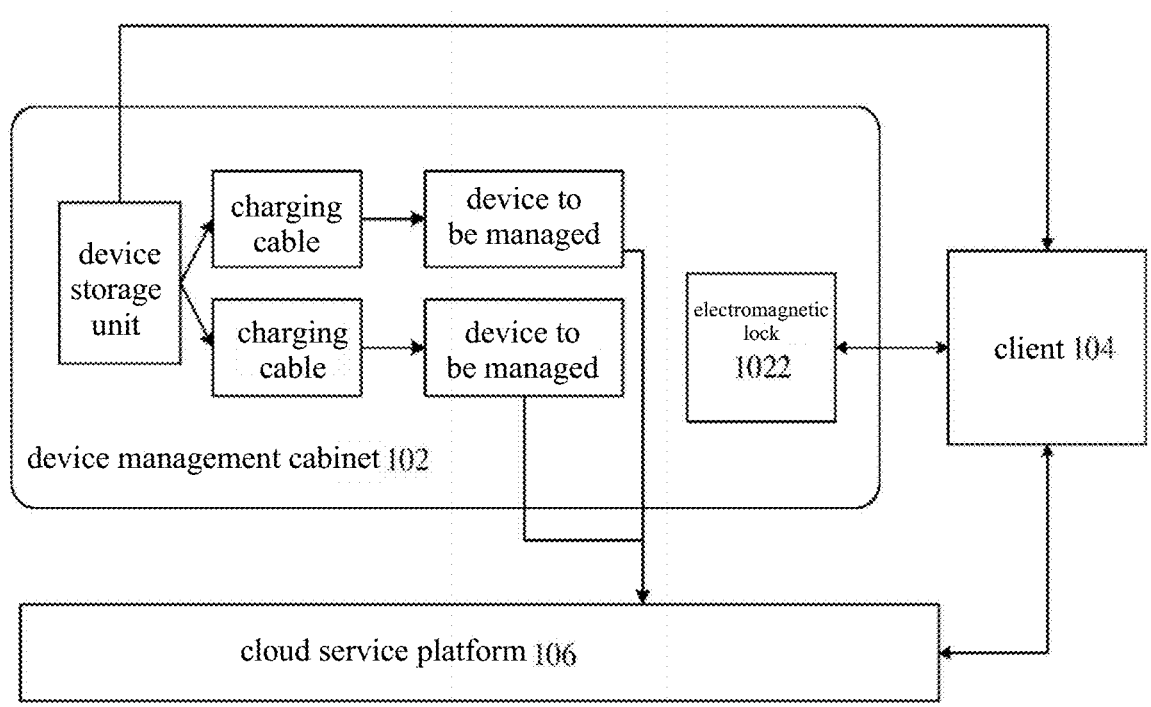
FIG. 1 is an architectural diagram of a device management system provided in an embodiment of the present specification.

Many specific details will be elaborated in the following description to facilitate a full understanding of the present specification. However, the present specification can be implemented in many other ways different from those described here, and those skilled in the art may conduct similar extensions without going against the connotation of the present specification. Thus, the present specification is not limited by the specific implementations disclosed below.

Terms used in one or more embodiments of the present specification are only for the purpose of describing specific embodiments, and are not intended to limit one or more embodiments of the present specification. Singular forms "a/an", "the" and "this" used in one or more embodiments of the present application and the attached claims are also intended to include the plural forms, unless otherwise clearly indicated in the context. It should also be understood that the term "and/or" used in one or more embodiments of the present specification refers to and includes any or all possible combinations of one or more associated items as listed.

It should be understood that although various information may be described employing terms such as first and second in one or more embodiments of the present specification, such information should not be limited to these terms. These terms are only used for distinguishing information of the same type from each other. For example, without departing from the scope of one or more embodiments of the present specification, the term "first" may also be referred to as "second", and similarly, "second" may also be referred to as "first". Depending on the context, the word "if" used here may be interpreted as "when" or "as" or "to determine . . . in response to . . . "

First, nouns or terms involved in one or more embodiments of the present specification are explained.

"Digital Terminal" is an electronic device that has data storage and computing capabilities, may perform secondary development, can perform data communication with other devices, is provided with a man-machine interface, and is powered by battery. A handheld terminal, a personal digital assistant, a handheld cash register, a barcode scanning gun and other devices widely used in industries such as express delivery/logistics/supermarket/intelligent manufacturing are a type of digital terminal.

"Terminal Management Cabinet" is a device or system that provides a digital terminal with device management functions such as borrow and return management, charging, state data statistics, fault reporting, and statistical analysis of usage.

In the present specification, a device management method is provided, and the present specification also relates to a device management system, a device management apparatus, a computing device, a computer-readable storage medium, and a computer program, each of which will be described in detail in the following embodiments.

Whether in an offline physical store or an online store, relevant staffs may need to use some mobile devices in the process of providing services to consumer users. For example, when a user buys a commodity object in an offline store, a cashier may provide a convenient and quick settlement service for the user through a mobile POS machine. That is to say, in order to provide services to consumer users, physical stores usually need to be staffed with a number of people who perform different tasks, and in order to ensure the normal progress of various tasks, each staff will be assigned a mobile device for his tasks. The staff may use the assigned mobile device or even borrow a mobile device of others to perform related tasks, which leads to confusion in the use and management of the devices. Therefore, an effective device management method is urgently needed to solve such problems.

In an embodiment of the present specification, in response to a borrow and return request for a device to be managed submitted by a user, an unlocking instruction is sent to an electromagnetic lock configured for a device management cabinet, wherein the electromagnetic lock unlocks the device management cabinet in response to the unlocking instruction; charging state information of a target device storage unit that is returned by the device management cabinet is received, wherein the target device storage unit is at least one of a plurality of device storage units in the device management cabinet, and the device to be managed is stored in the target device storage unit; lock state data of the device management cabinet that is sent by the electromagnetic lock is received, and electric quantity state information of the device to be managed is acquired; and borrow and return information of the device to be managed is generated according to the charging state information, the electric quantity state information and the lock state data.

In embodiment of the present specification, a device management cabinet is utilized to achieve the storage, receipt, return, charging and other daily digital managements of a device to be managed, so as to avoid waste of resources caused by loss of the device to be managed, and be beneficial to improving the utilization rate of the device to be managed. Additionally, according to the received charging state information of a target device storage unit, electric quantity state information of the device to be managed and lock state data of the device management cabinet, a client generates borrow and return information of the device to be managed, which is beneficial to ensuring the accuracy of a generation result of the borrow and return information.

FIG. 1 shows an architectural diagram of a device management system provided according to an embodiment of the present specification, specifically including:

a device management cabinet 102 and a client 104, wherein the device management cabinet 102 includes an electromagnetic lock 1022, and the device management cabinet 102, the electromagnetic lock 1022 and the client 104 are in communication connection with each other through Bluetooth;

the electromagnetic lock 1022 is configured to unlock or lock the device management cabinet 102 in response to an unlocking instruction or a locking instruction, and send lock state data of the device management cabinet 102 to the client 104;

the device management cabinet 102 is configured to detect, in an unlocked state, charging state information of a target device storage unit of a plurality of device storage units, and send the charging state information to the client 104; and the client 104 is configured to acquire electric quantity state information of a device to be managed, and generate borrow and return information of the device to be managed according to the charging state information, the electric quantity state information and the lock state data, wherein the device to be managed is stored in the target device storage unit.

Specifically, the device to be managed is a digital terminal on which device management needs to be performed, including, but not limited to, a handheld terminal, a personal digital assistant, a handheld cash register, a barcode scanning gun, or the like that are widely used in industries such as express delivery/logistics/supermarket/intelligent manufacturing. The device management includes, but is not limited to, borrow and return management, charging, state data statistics, fault reporting, statistical analysis of usage, or the like.

The client 104 includes, but is not limited to, a mobile computer, a mobile computing device, or a face recognition device, wherein the mobile computing device includes, but is not limited to, a smart phone, a tablet computer, a personal digital assistant, a laptop computer, a notebook computer, a netbook, a mobile phone (e.g., a smart phone), a wearable computing device (e.g., a smart watch, smart glasses, etc.), or other types of computing devices, or a stationary computing device such as a desktop computer or PC.

In the device management system provided in the embodiment of the present specification, the device management cabinet 102 includes a plurality of device storage units, each device storage unit may be used to store one or at least two devices to be managed, and each device storage unit is configured with a charging cable that may be used to charge the device(s) to be managed. After a user places a device to be managed in the device storage unit, the charging cable needs to be inserted into the device to be managed, so as to ensure that the device to be managed enters a charging state. When the user takes out the device to be managed from the device storage unit, the charging cable within the device storage unit needs to be disconnected from the device to be managed. Therefore, when generating borrow and return information of the device to be managed, the client 104 may determine whether the device to be managed is successfully returned, or whether it is successfully borrowed, according to charging state information of the device to be managed and the device storage unit.

Additionally, each device management cabinet is configured with one electromagnetic lock 1022 that may be used to control opening/closing of the device management cabinet, and a device storage unit and the electromagnetic lock 1022 in the device management cabinet 102 may perform data transmission with the client 104 through Bluetooth.

Specifically, in a case that the user has a borrow or return demand for a device to be managed, the user may send an unlocking instruction to the electromagnetic lock through the client 104, and the client 104 may first perform an identity authentication on the user prior to sending the unlocking instruction, and send the unlocking instruction to the electromagnetic lock 1022 in a case that the identity authentication is passed, so that the electromagnetic lock 1022 performs an unlocking operation on the device management cabinet 102; after successful unlocking, the user may borrow a device to be managed from any one device storage unit in the device management cabinet 102, or place a device to be managed that has been borrowed in an idle device storage unit in the device management cabinet, so as to achieve return of the device to be managed.

In an unlocked state, the device management cabinet 102 may detect charging state information of each device storage unit, for example, time information on starting charging or disconnecting charging (a time point of starting or stopping charging for a device to be managed), and send the information to the client 104. Additionally, after the user successfully takes out the device to be managed from the device storage unit, or successfully places the device to be managed in the device storage unit, a locking instruction may be sent to the electromagnetic lock 1022 through the client 104, and the electromagnetic lock 1022 performs a locking operation on the device management cabinet 102 in response to the locking instruction, and sends lock state data of the device management cabinet 102 to the client 104.

After receiving the charging state information of the device storage unit and the lock state data of the electromagnetic lock 1022, the client 104 may further acquire charging state information of the device to be managed, so as to generate borrow or return information of the device to be managed according to the information, wherein the charging state information of the device to be managed is sent to the client 104 by the device to be managed.

In practical applications, if the client 104 used by the user is a mobile computer or a mobile computing device (e.g., a smart phone), the user may implement borrow and return operations on the device to be managed through an application carried in the mobile computer or the mobile computing device. When the client 104 performs an identity authentication on the user, the identity authentication may be performed on the user through login information of the user in the application. If the client 104 used by the user is a face recognition device (e.g., a face recognition PAD), the identity authentication may be performed on the user by means of face recognition, which may be specifically determined according to actual needs, to which no limination is made herein.

Additionally, the device management system provided in the embodiment of the present specification further includes a cloud service platform 106. The electric quantity state information of the device to be managed that is used when the client 104 generates the borrow and return information of the device to be managed may be initiatively sent to the client by the device to be managed through the cloud service platform 106. The cloud service platform 106 only has a data mirroring function, and the client is responsible for local computing and decision-making.

In the embodiment of the present specification, the device management cabinet is utilized to achieve the storage, receipt, return, charging and other daily digital managements of the device to be managed, so as to avoid waste of resources caused by loss of the device to be managed, and be beneficial to improving the utilization rate of the device to be managed. Additionally, according to the received charging state information of the target device storage unit, electric quantity state information of the device to be managed and lock state data of the device management cabinet, the client generates the borrow and return information of the device to be managed, which is beneficial to ensuring the accuracy of a generation result of the borrow and return information. In addition, in the embodiment of the present specification, communication is performed among the device management cabinet, the electromagnetic lock and the client through the low-cost Bluetooth technology, while the device to be managed may report its own charging state and change information of the charging state through the Wi-Fi, and the device management cabinet itself does not have computing and transmission capabilities, thereby being beneficial to reducing the production costs of the device management cabinet.

Figure 2:
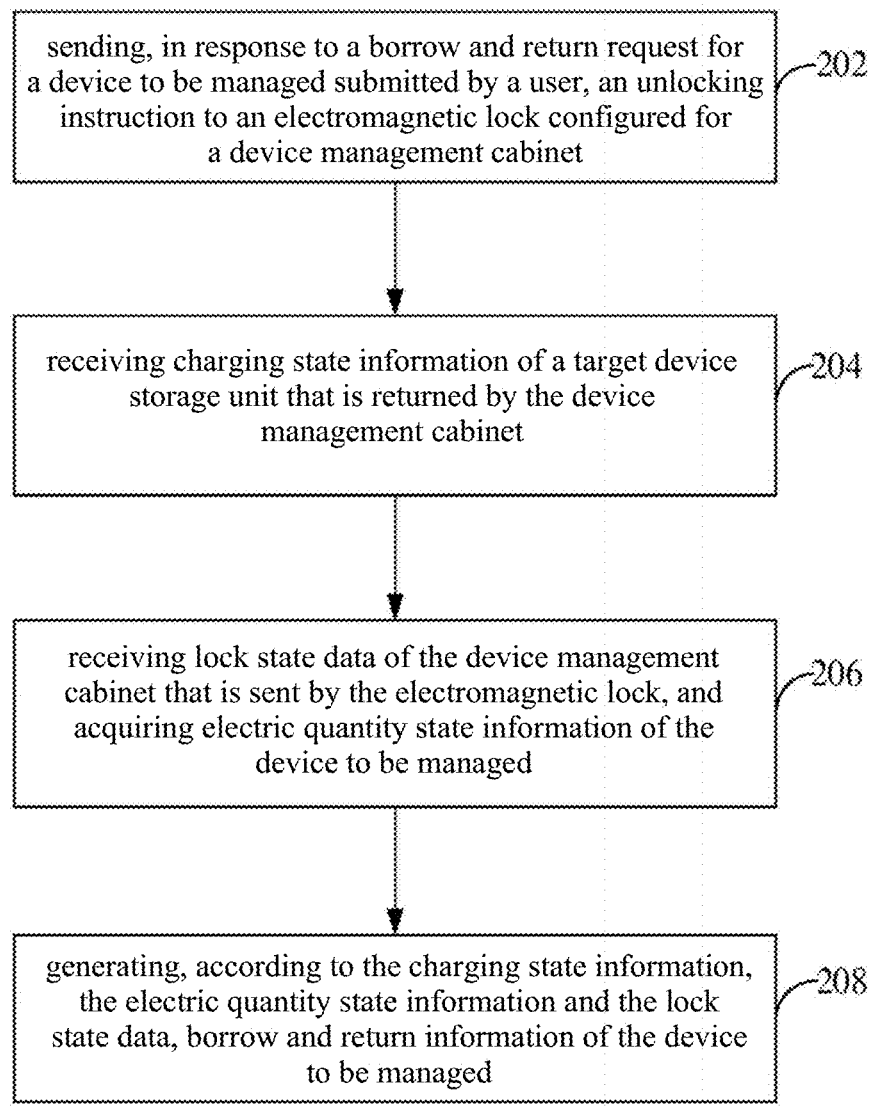
FIG. 2 is a flow chart of a first device management method provided in an embodiment of the present specification.

FIG. 2 shows a flow chart of a first device management method provided according to an embodiment of the present specification, which specifically includes the following steps.

At step S202, in response to a borrow and return request for a device to be managed submitted by a user, an unlocking instruction is sent to an electromagnetic lock configured for a device management cabinet, wherein the electromagnetic lock unlocks the device management cabinet in response to the unlocking instruction.

The device management method provided in the embodiment of the present specification is applied to a client, and a user may send the borrow and return request for the device to be managed to the device management cabinet through the client.

Specifically, the device to be managed is a digital terminal on which device management needs to be performed, including, but not limited to, a handheld terminal, a personal digital assistant, a handheld cash register, a barcode scanning gun, or the like that are widely used in industries such as express delivery/logistics/supermarket/intelligent manufacturing. The device management includes, but is not limited to, borrow and return management, charging, state data statistics, fault reporting, statistical analysis of usage, or the like.

The client includes, but is not limited to, a mobile computer, a mobile computing device, or a face recognition device, wherein the mobile computing device includes, but is not limited to, a smart phone, a tablet computer, a personal digital assistant, a laptop computer, a notebook computer, a netbook, etc., a mobile phone (e.g., a smart phone), a wearable computing device (e.g., a smart watch, smart glasses, etc.), or other types of computing devices, or a stationary computing device such as a desktop computer or PC.

In the embodiment of the present specification, the device management cabinet includes a plurality of device storage units, each device storage unit may be used to store one or at least two devices to be managed, and each device management cabinet is configured with one electromagnetic lock that may be used to control opening/closing of the device management cabinet.

Specifically, in a case that the user has a borrow or return demand for a device to be managed, the user may send an unlocking instruction to the electromagnetic lock through the client, and the client may first perform an identity authentication on the user prior to sending the unlocking instruction, and send the unlocking instruction to the electromagnetic lock in a case that the identity authentication is passed, so that the electromagnetic lock performs an unlocking operation on the device management cabinet.

In specific implementation, the identity authentication may be performed on the user specifically in the following ways:

calling an image collection component to collect a face image of the user and performing identity recognition on the user based on a collection result; and sending the unlocking instruction to the electromagnetic lock configured for the device management cabinet, in a case of determining, according to an identity recognition result, that the user meets a borrow and return condition.

Alternatively, acquiring login information of the user associated with the client, and sending the unlocking instruction to the electromagnetic lock configured for the device management cabinet, in a case of determining, according to the login information, that the user meets a borrow and return condition.

Specifically, if the client used by the user is a mobile computer or a mobile computing device (e.g., a smart phone), the user may implement borrow and return operations on the device to be managed through an application carried in the mobile computer or the mobile computing device. When the client performs an identity authentication on the user, the identity authentication may be performed on the user through login information of the user in the application. If the client used by the user is a face recognition device (e.g., a face recognition PAD), the identity authentication may be performed on the user by means of face recognition, which may be specifically determined according to actual needs, and is not limited here.

In the embodiment of the present specification, the device management cabinet is opened by means of identity authentication, so that the device to be managed is taken out and placed more securely, thereby being beneficial to improving the security of device management.

In specific implementation, a device storage unit and the electromagnetic lock in the device management cabinet may perform data transmission with the client through Bluetooth, and Bluetooth communication links between the device storage unit and the electromagnetic lock and the client may be established in the following ways:

evaluating at least one device to be managed in the device management cabinet that meets a borrow condition, determining a device storage unit in which the at least one device to be managed is located, and establishing a first Bluetooth communication link with the device storage unit;

evaluating at least one device storage unit in the device management cabinet that meets a return condition for the device to be managed, and establishing a second Bluetooth communication link with the at least one device storage unit; and establishing a third Bluetooth communication link with the electromagnetic lock, wherein the first Bluetooth communication link, the second Bluetooth communication link and the third Bluetooth communication link serve as a Bluetooth main link between the client and the device management cabinet.

Specifically, in a case that both the device management cabinet and the client are in an idle state (without borrow and return operations on a device to be managed), the client may evaluate, through the borrow logic of devices to be managed, a device storage unit in which a device to be managed that meets a borrow condition is located, and maintain a Bluetooth connection state with the same, that is, establish a first Bluetooth communication link with the same. Additionally, the client may evaluate, through the return logic of devices to be managed, a fault-free idle device storage unit (a device storage unit that meets a return condition), and maintain a Bluetooth connection state with the same, that is, establish a second Bluetooth communication link with the same. In addition, the client may further establish a third Bluetooth communication link with the electromagnetic lock, and the first Bluetooth communication link, the second Bluetooth communication link and the third Bluetooth communication link together serve as a Bluetooth main link between the client and the device management cabinet, so as to implement data transmission between the client and the device management cabinet through the Bluetooth main link.

Further, after the Bluetooth main link is established between the client and the device management cabinet, sending, in response to a borrow and return request for a device to be managed submitted by a user, an unlocking instruction to the electromagnetic lock configured for the device management cabinet may be implemented specifically in the following ways:

sending, in response to a borrow request for the device to be managed submitted by a user, an unlocking instruction to the electromagnetic lock configured for the device management cabinet, and disconnecting the second Bluetooth communication link with the at least one device storage unit; or sending, in response to a return request for the device to be managed submitted by a user, the unlocking instruction to the electromagnetic lock configured for the device management cabinet, and disconnecting the first Bluetooth communication link established with the device storage unit.

Specifically, after proceeding to a borrow process of a device to be managed, the client cuts off the Bluetooth connection established based on the return logic of devices to be managed, that is, disconnects the second Bluetooth communication link with the at least one device storage unit, and acquires charging state information of a device storage unit that has a first Bluetooth communication connection with the client; alternatively, after proceeding to a return process of a device to be managed, the Bluetooth connection established based on the borrow logic of devices to be managed is cut off, that is, the first Bluetooth communication link established with the device storage unit is disconnected, and charging state information of a device storage unit that has a second Bluetooth communication connection with the client is acquired.

In the present specification, communication is performed among the device management cabinet, the electromagnetic lock and the client through the low-cost Bluetooth technology, while the device to be managed may report its own charging state and change information of the charging state through the Wi-Fi, and the device management cabinet itself does not have computing and transmission capabilities, thereby being beneficial to reducing the production costs of the device management cabinet.

At step S204, charging state information of a target device storage unit that is returned by the device management cabinet is received, wherein the target device storage unit is at least one of a plurality of device storage units in the device management cabinet, and the device to be managed is stored in the target device storage unit.

Specifically, after the device management cabinet is successfully unlocked, the user can borrow a device to be managed from any one device storage unit in the device management cabinet, or place a device to be managed that has been borrowed in an idle device storage unit in the device management cabinet, so as to achieve return of the device to be managed.

In an unlocked state, the device management cabinet may detect charging state information of each device storage unit, for example, time information on starting charging or disconnecting charging (a time point of starting or stopping charging for a device to be managed), and send the information to the client.

In specific implementation, after the Bluetooth main link is established between the client and the device management cabinet, charging state information of a target device storage unit that is returned by the device management cabinet is received, specifically, charging state information of a target storage unit that is returned by the device management cabinet through the first Bluetooth communication link or the second Bluetooth communication link is received.

Specifically, the client may evaluate, through the borrow logic of devices to be managed, a device storage unit in which a device to be managed that meets a borrow condition is located, and establish a first Bluetooth communication link with the same; and may also evaluate, through the return logic of devices to be managed, a fault-free idle device storage unit, and establish a second Bluetooth communication link with the same. In addition, the client may further establish a third Bluetooth communication link with the electromagnetic lock.

After proceeding to a borrow process of a device to be managed, the client cuts off the Bluetooth connection established based on the return logic of devices to be managed, that is, disconnects the second Bluetooth communication link with the at least one device storage unit. In this case, the client may receive, through the first Bluetooth communication link, charging state information of a target storage unit that is returned by the device management cabinet.

Alternatively, after proceeding to a return process of a device to be managed, the client cuts off the Bluetooth connection established based on the borrow logic of devices to be managed, that is, disconnects the first Bluetooth communication link established with the device storage unit. In this case, the client may receive, through the second Bluetooth communication link, charging state information of a target storage unit that is returned by the device management cabinet.

In the embodiment of the present specification, the device management cabinet is utilized to achieve the storage, receipt, return, charging and other daily digital managements of the device to be managed, so as to avoid waste of resources caused by loss of the device to be managed, and be beneficial to improving the utilization rate of the device to be managed. Additionally, according to the received charging state information of the target device storage unit, electric quantity state information of the device to be managed and lock state data of the device management cabinet, the client generates the borrow and return information of the device to be managed, which is beneficial to ensuring the accuracy of a generation result of the borrow and return information. In addition, in the embodiment of the present specification, communication is performed among the device management cabinet, the electromagnetic lock and the client through the low-cost Bluetooth technology, while the device to be managed may report its own charging state and change information of the charging state through the Wi-Fi, and the device management cabinet itself does not have computing and transmission capabilities, thereby being beneficial to reducing the production costs of the device management cabinet.

At step S206, lock state data of the device management cabinet that is sent by the electromagnetic lock is received, and electric quantity state information of the device to be managed is acquired.

Specifically, after the user successfully takes out the device to be managed from the device storage unit, or successfully places the device to be managed in the device storage unit, a locking instruction may be sent to the electromagnetic lock through the client, and the electromagnetic lock performs a locking operation on the device management cabinet in response to the locking instruction, and sends lock state data of the device management cabinet to the client.

Since the client establishes the third Bluetooth communication link with the electromagnetic lock, lock state data of the device management cabinet that is sent by the electromagnetic lock is received, specifically, lock state data of the device management cabinet that is sent by the electromagnetic lock through the third Bluetooth communication link is received.

Additionally, after the user successfully takes out the device to be managed from the device storage unit, or successfully places the device to be managed in the device storage unit, this device to be managed may send its own electric quantity state information to the client, and thus the electric quantity state information of the device to be managed is acquired, specifically, the electric quantity state information of the device to be managed that is returned by the cloud service platform is acquired, wherein the electric quantity state information is sent to the cloud service platform by the device to be managed.

Specifically, in a case that no Bluetooth communication connection is established between the device to be managed and the client, the cloud service platform can be used as an intermediate transmission medium to send the electric quantity state information of the device to be managed to the client, wherein whether the device to be managed and the cloud service platform, or the cloud service platform and the client, can be connected therebetween through a communication network, the communication network including, but not limited to, a wireless local area network (WLAN), a worldwide interoperability for microwave access (Wi-MAX), an Ethernet, a cellular network, or the like, and the electric quantity state information may include charging time information and electric quantity information of the device to be managed.

In the embodiment of the present specification, the cloud service platform only has a data mirroring function, communication is performed among the device management cabinet, the electromagnetic lock and the client through the low-cost Bluetooth technology, while the device to be managed may report its own charging state and change information of the charging state through the Wi-Fi, and the device management cabinet itself does not have computing and transmission capabilities, thereby being beneficial to reducing the production costs of the device management cabinet.

At step S208, borrow and return information of the device to be managed is generated according to the charging state information, the electric quantity state information and the lock state data.

In specific implementation, after acquiring the charging state information, the electric quantity state information and the lock state data, the client generates borrow and return information of the device to be managed according to the charging state information, the electric quantity state information and the lock state data, specifically, in a case of determining, according to the lock state data, that the device management cabinet is in the locked state, the charging state information is compared with the electric quantity state information; in a case of a consistent comparison result, borrow information or return information of the device to be managed is generated.

In the embodiment of the present specification, the device management cabinet includes a plurality of device storage units, each device storage unit may be used to store one or at least two devices to be managed, and each device storage unit is configured with a charging cable that may be used to charge the device(s) to be managed. After a user places a device to be managed in the device storage unit, the charging cable needs to be inserted into the device to be managed, so as to ensure that the device to be managed enters a charging state. When the user takes out the device to be managed from the device storage unit, the charging cable within the device storage unit needs to be disconnected from the device to be managed. Therefore, the client may determine whether the device to be managed is successfully returned, or whether it is successfully borrowed, according to charging state information of the device to be managed and the device storage unit, so as to generate borrow and return information of the device to be managed.

Taking the user returning the device to be managed as an example, every time the user successfully places the device to be managed in the device storage unit, and inserts the charging cable within the device storage unit into the device to be managed, so as to successfully charge the device to be managed, a locking instruction may be sent by the client to the electromagnetic lock, while in a case that the client receives lock state data that is sent by the electromagnetic lock and determines, according to the lock state data, that the electromagnetic lock is in a locking state, then it can be determined whether the device to be managed is indeed in the device storage unit based on the charging state information of the device storage unit and the charging state information of the device to be managed.

If it is determined that a time difference between a time when the device storage unit starts charging the device to be managed and a time when the device to be managed starts charging is less than a preset time threshold, then it may be determined that the device to be managed has been successfully placed in the device storage unit. In this case, the client may generate information on successful return of the device to be managed based on the foregoing information.

Additionally, as described above, in a case that both the client and the device management cabinet are in an idle state, the client may acquire relevant data of the device management cabinet through the Bluetooth main link. In practical applications, in order to ensure the efficiency, accuracy and integrity of data transmission between the client and the device management cabinet, in addition to the Bluetooth main link, a Bluetooth auxiliary link may also be established between the client and the device management cabinet, so that the Bluetooth main link may be switched to the Bluetooth auxiliary link to continue the data transmission in a case of a special fault in the Bluetooth main link, which may be implemented in the following way:

sampling through the Bluetooth main link according to a preset data sampling interval to acquire charging state information of respective device storage units in the device management cabinet, charging state information of a device to be managed in the respective device storage units, and lock state data of the electromagnetic lock, in a case that the device management cabinet is in a locked state;

determining whether an acquisition result of the charging state information of the respective device storage units, the charging state information of the device to be managed in the respective device storage units, and the lock state data of the electromagnetic lock meets a preset acquisition condition; and disconnecting the Bluetooth main link, and acquiring, through a Bluetooth auxiliary link, charging state information of the respective device storage units in the device management cabinet, charging state information of the device to be managed in the respective device storage units, and lock state data of the electromagnetic lock, if the acquisition result of the charging state information of the respective device storage units, the charging state information of the device to be managed in the respective device storage units, and the lock state data of the electromagnetic lock does not meet the preset acquisition condition.

The Bluetooth auxiliary link may be established in the following way:

establishing a fourth Bluetooth communication link between the target device to be managed and the respective device storage unit in the device management cabinet, and establishing a fifth Bluetooth communication link between the target device to be managed and the electromagnetic lock, the fourth Bluetooth communication link, the fifth Bluetooth communication link, a communication link between the target device to be managed and the cloud service platform, and a communication link between the cloud service platform and the client together forming the Bluetooth auxiliary link.

Further, establishing the fourth Bluetooth communication link between the target device to be managed and the respective device storage units in the device management cabinet may be implemented specifically in the following way:

determining an electric quantity of a device to be managed in the respective device storage units in the device management cabinet, and taking a device to be managed that has an electric quantity lower than a preset electric quantity threshold as the target device to be managed; and establishing the fourth Bluetooth communication link between the target device to be managed and the respective device storage unit in the device management cabinet.

Specifically, in a case that the device management cabinet is in the unlocked state, the client may acquire charging state information of each device storage unit in the device management cabinet, charging state information of a device to be managed in the device storage unit, and lock state data of the electromagnetic lock in real time through the Bluetooth main link; and in a case that the device management cabinet is in the locked state, the client may acquire the above data through the Bluetooth main link according to a preset time interval, and the preset time interval may be 5 minutes, 10 minutes, etc.

In a process of acquiring charging state information, when unstable communication exists in the Bluetooth main link (signals are unstable, or charging state information and lock state data are acquired at a slower speed, or acquisition results are incomplete, etc.), the Bluetooth auxiliary link may be switched to promptly, and charging state information of each device storage unit in the device management cabinet, charging state information of a device to be managed in the device storage unit, and lock state data of the electromagnetic lock are continuously acquired through the Bluetooth auxiliary link.

Additionally, the client may decide whether to switch back to the Bluetooth main link in accordance with a Bluetooth signal state of the electromagnetic lock and the respective device storage units in the device management cabinet that is scanned in real time.

When the Bluetooth auxiliary link is being established, a target device to be managed may be first selected from devices to be managed that are stored in the respective device storage units in the device management cabinet, so as to establish the Bluetooth auxiliary link through the target device to be managed.

In practical applications, the target device to be managed may be screened by an electric quantity of respective devices to be managed, specifically, any device to be managed having an electric quantity lower than a preset threshold among various devices to be managed may be taken as the target device to be managed, and the fourth Bluetooth communication link is established between the target device to be managed and the respective device storage units in the device management cabinet, and the fifth Bluetooth communication link is established between the target device to be managed and the electromagnetic lock, so that the fourth Bluetooth communication link, the fifth Bluetooth communication link, the communication link between the target device to be managed and the cloud service platform, and the communication link between the cloud service platform and the client together form the Bluetooth auxiliary link.

The embodiment of the present specification ensures the reliability and real-time performance of communication through the dual backup communication method of the Bluetooth main link and the Bluetooth auxiliary link.

Further, acquiring, through the Bluetooth auxiliary link, the charging state information of the respective device storage units in the device management cabinet, the charging state information of the device to be managed in the respective device storage units, and the lock state data of the electromagnetic lock may be implemented specifically in the following way:

acquiring, through the communication link between the cloud service platform and the client, the charging state information of the respective device storage units in the device management cabinet, the charging state information of the device to be managed in the respective device storage units, and the lock state data of the electromagnetic lock;

wherein the charging state information of the respective device storage units is transmitted to the target device to be managed by the respective device storage units through the fourth Bluetooth communication link, the lock state data is sent to the target device to be managed by the electromagnetic lock through the fifth Bluetooth communication link, and the target device to be managed sends the charging state information of the respective device storage units in the device management cabinet, the charging state information of the device to be managed in the respective device storage units, and the lock state data of the electromagnetic lock to the client through the communication link with the cloud service platform and the communication link between the cloud service platform and the client.

Specifically, after switching to the Bluetooth auxiliary link, both the charging state information of the device storage unit and the lock state data of the electromagnetic lock need to be sent to the client by the target device to be managed, wherein the charging state information of the device storage unit may be transmitted to the target device to be managed through the fourth Bluetooth communication link, and the lock state data may be sent to the target device to be managed through the fifth Bluetooth communication link, while the target device to be managed may send the charging state information and the lock state data to the cloud service platform through the communication link with the cloud service platform, and then the cloud service platform sends the charging state information and the lock state data to the client through the communication link with the client.

In addition, generating, according to the charging state information, the electric quantity state information and the lock state data, the borrow and return information of the device to be managed may also be implemented in the following way:

acquiring acceleration data of the device to be managed, in a case of determining, according to the lock state data, that the device management cabinet is in the locked state;

comparing the charging state information with the electric quantity state information, in a case of determining, according to the acceleration data, that the device to be managed is in a static state; and generating return information of the device to be managed in a case of a consistent comparison result.

Specifically, if the request received by the client is a return request, the client may acquire acceleration data of the device to be managed in the case of determining, according to the lock state data, that the device management cabinet is in the locked state. The acceleration data may be sent to the client by the device to be managed through the Bluetooth main link or the Bluetooth auxiliary link. In the case of determining, according to the acceleration data, that the device to be managed is in the static state, the client may further do that according to the charging state information of the device to be managed and the charging state information of the device storage unit. If it is determined that a time difference between a time when the device storage unit starts charging the device to be managed and a time when the device to be managed starts charging is less than a preset time threshold, then it may be determined that the device to be managed has been successfully placed in the device storage unit. In this case, the client may generate information on successful return of the device to be managed based on the foregoing information.

In the embodiment of the present specification, the motion state of the device to be managed is determined in combination with the acceleration data, and in the case of determining that the device to be managed is in the static state, the borrow and return information of the device to be managed is generated further in combination with the charging state information of the device to be managed and the charging state information of the device storage unit, thereby being beneficial to ensuring the accuracy of a generation result of the borrow and return information.

Figure 3:
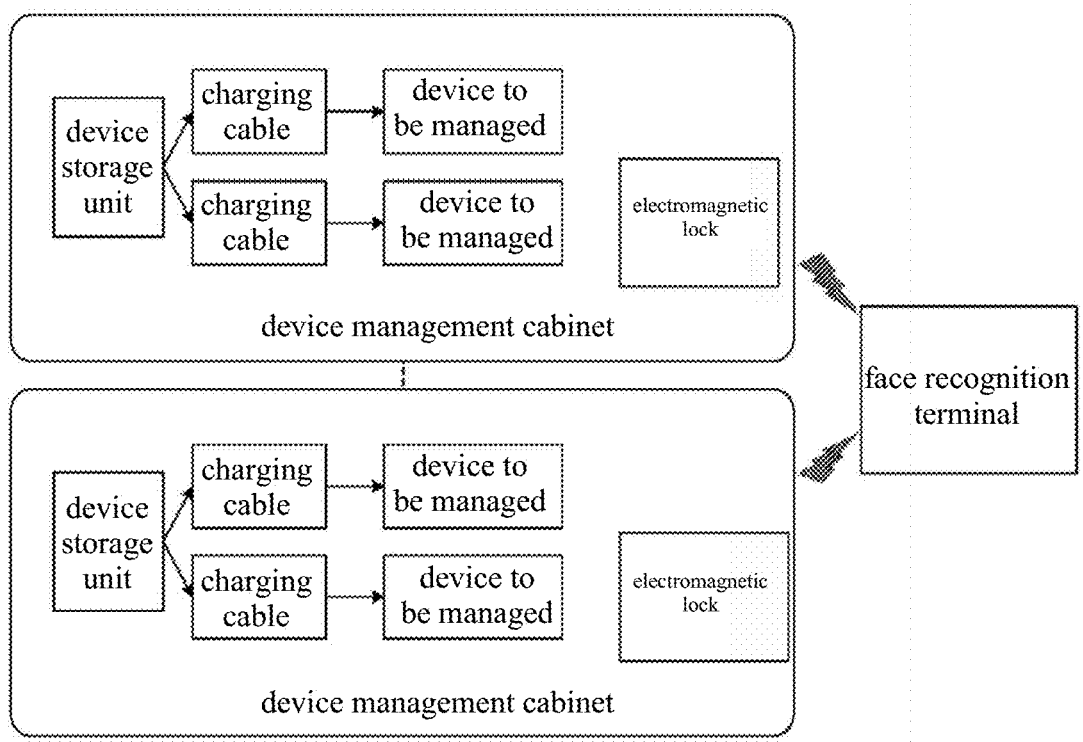
FIG. 3 is a schematic diagram of a device management process provided in an embodiment of the present specification.

The schematic diagram of a device management process provided in the embodiment of the present specification is as shown in FIG. 3. In a case that the client is a face recognition terminal, a face recognition terminal may establish Bluetooth communication links with the device storage units and electromagnetic locks in a plurality of device management cabinets, thereby achieving that one face recognition terminal controls a plurality of device management cabinets, so as to achieve that the storage, receipt, return, charging and other daily digital managements of devices to be managed in the plurality of device management cabinets can be performed in a case of using a small number of face recognition terminals.

The device to be managed may report its own charging state and change information of the charging state through the Wi-Fi, Bluetooth is used as a communication link between the client for local information collection and the electromagnetic lock, and the device management cabinet itself does not have computing and transmission capabilities, thereby being beneficial to reducing the production costs of the device management cabinet. Additionally, a face recognition device is utilized for face recognition, which is beneficial to improving the response speed and thereby improving the system user experience.

For the electromagnetic lock, lock control related functions such as unlocking, locking and lock state query may be completed through instruction sending and receiving in a Bluetooth connection state.

For the charging cable, an integrated LED lamp may be used to indicate an intact charging function state of the grid port, and a change in color may be used to further indicate entry into a normal charging state.

For the device to be managed, an application configured or installed by the device itself may be used to collect its charging state and charging current data, sense its own information states of static placement and taking process, and upload them to the cloud service platform through the Wi-Fi, and they are synchronized to the face recognition terminal by the cloud service platform.

For the face recognition terminal, it may execute local edge computing to implement the management functions of the device management cabinet in online and offline states, including, but not limited to, face database registration, face recognition, authority management, allocation and management procedures of devices to be managed in a borrowing process, selection and management procedures of devices storage unit in a process of returning a device to be managed, repair management procedure, manager-related management procedure, digital terminal management cabinet state query and fault diagnosis, or the like. However, in the process of face recognition, in order to ensure the security of face recognition information, only face feature data is stored as a computing database, while face image data is not stored or transmitted.

A process that a user borrows a device to be managed through the face recognition terminal is specifically as follows:

performing face recognition registration at the face recognition terminal →submitting a borrow request for the device to be managed at the face recognition terminal→scanning the face→unlocking the electromagnetic lock→opening the door→according to a voice prompt, or according to a flash/a screen prompt on the device to be managed, taking out the corresponding device to be managed→closing the door→generating, by the face recognition terminal, borrow information of the device to be managed, and providing a voice prompt for an end of the process.

A process that the user returns the device to be managed through the face recognition terminal is specifically as follows:

submitting a return request for the device to be managed at the face recognition terminal→scanning the face-→unlocking the electromagnetic lock→opening the door, providing a voice prompt for the serial number of a device storage unit in the idle state→a voice prompt to check that a charging cable lights up and insert the charging cable to confirm entry into the charging state-→according to an LED indicator state of the charging cable, confirming that an optional grid port is available→inserting the charging cable, observing the charging cable entering the charging state/a screen prompt on the device to be managed, and confirming successful return→closing the door→generating, by the face recognition terminal, return information of the device to be managed, and providing a voice prompt for an end of the process.

When determining that the device to be managed is taken out with a non-flash prompt, the face recognition terminal may voice remind to place it back before closing the door. When detecting that the device management cabinet has not been closed for a long time, this may be voice reminded through the device to be managed or the face recognition terminal. In a case of detecting that the user takes out a plurality of devices to be managed at the same time, the login account of one of the devices to be managed may be designated, while other devices to be managed are prohibited from use and given voice and vibration reminders of return. For other abnormal problems, reminder processing may also be performed through other prompt channels.

In the embodiment of the present specification, in response to a borrow and return request submitted by a user for a device to be managed, an unlocking instruction is sent to an electromagnetic lock configured for a device management cabinet, wherein the electromagnetic lock unlocks the device management cabinet in response to the unlocking instruction; charging state information of a target device storage unit that is returned by the device management cabinet is received, wherein the target device storage unit is at least one of a plurality of device storage units in the device management cabinet, and the device to be managed is stored in the target device storage unit; lock state data of the device management cabinet that is sent by the electromagnetic lock is received, and electric quantity state information of the device to be managed is acquired; and borrow and return information of the device to be managed is generated according to the charging state information, the electric quantity state information and the lock state data.

In the embodiment of the present specification, the device management cabinet is utilized to achieve the storage, receipt, return, charging and other daily digital managements of the device to be managed, so as to avoid waste of resources caused by loss of the device to be managed, and be beneficial to improving the utilization rate of the device to be managed. Additionally, according to the received charging state information of the target device storage unit, electric quantity state information of the device to be managed and lock state data of the device management cabinet, the client generates the borrow and return information of the device to be managed, which is beneficial to ensuring the accuracy of a generation result of the borrow and return information.

Figure 4:
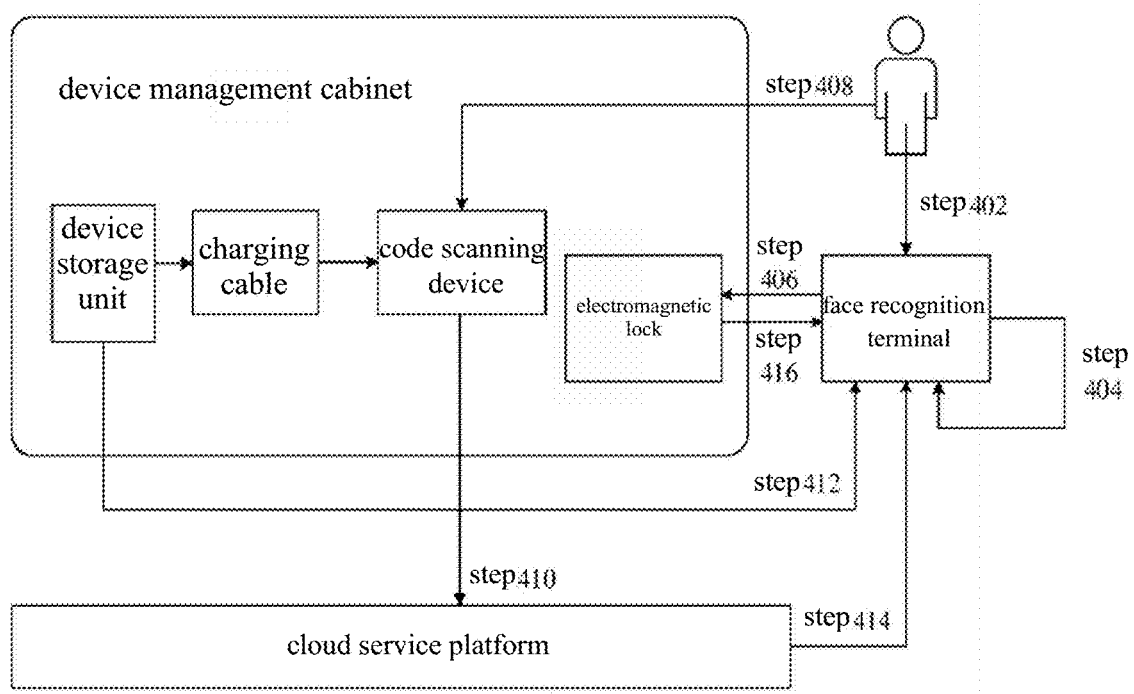
FIG. 4 is a flow chart of a processing process of a device management method provided in an embodiment of the present specification.

The device management method will be further explained below with reference to FIG. 4, by taking the application of the device management method provided in the present specification in a scenario of return of a code scanning device as an example. FIG. 4 shows a flow chart of a processing process of a device management method provided in an embodiment of the present specification, which specifically includes the following steps.

At step S402, a user sends a return request for a code scanning device to a face recognition terminal.

At step S404, the face recognition terminal collects a face image of the user, and performs an identity authentication on the user based on a collection result.

In a case that the authentication is passed, step 406 is executed.

At step S406, the face recognition terminal sends an unlocking instruction to an electromagnetic lock.

Specifically, the electromagnetic lock responds to the unlocking instruction and performs an unlocking operation.

At step 408, the user opens a device management cabinet and places the code scanning device in any one idle device storage unit in the device management cabinet.

Specifically, after the user places the code scanning device in the device storage unit, a charging cable in the device storage unit needs to be inserted into the code scanning device to charge the code scanning device.

At step S410, the code scanning device sends charging state information of the code scanning device to a cloud service platform.

At step S412, the device storage unit sends electric quantity state information of the device storage unit to the face recognition terminal.

At step S414, the cloud service platform sends the charging state information to the face recognition terminal.

At step S416, the electromagnetic lock sends lock state data of the device management cabinet to the face recognition terminal.

After receiving the charging state information, the electric quantity state information and the lock state data, the face recognition terminal generates return information of the code scanning device based on this part of data.

In the embodiment of the present specification, the device management cabinet is utilized to implement the storage, receipt, return, charging and other daily digital managements of the code scanning device, so as to avoid waste of resources caused by loss of the code scanning device, and be beneficial to improving the utilization rate of the code scanning device. Additionally, according to the received charging state information of the code scanning device, electric quantity state information of the device storage unit and lock state data of the device management cabinet, the face recognition terminal generates the return information of the code scanning device, which is beneficial to ensuring the accuracy of a generation result of the return information.

Figure 5:
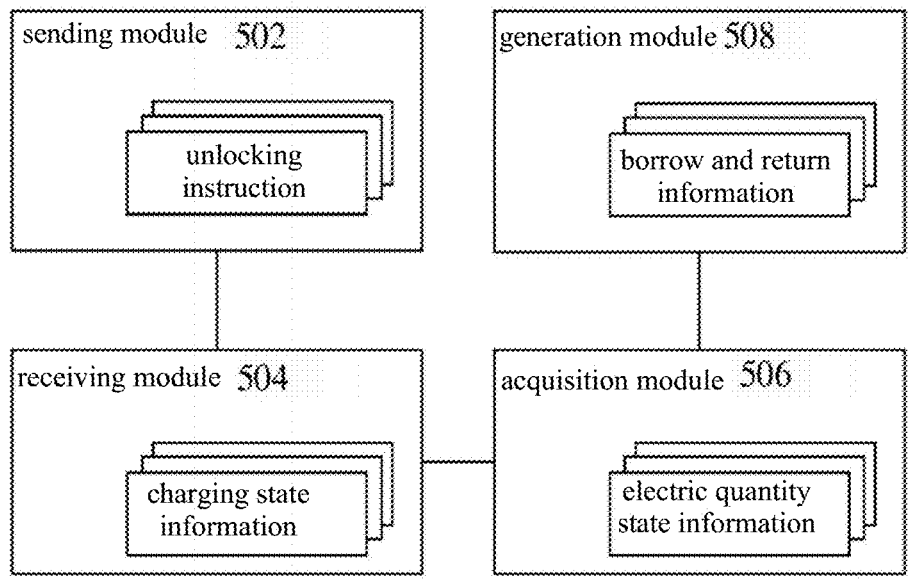
FIG. 5 is a structural schematic diagram of a first device management apparatus provided in an embodiment of the present specification.

Corresponding to the above method embodiment, the present specification further provides an embodiment of a device management apparatus, and FIG. 5 shows a structural schematic diagram of a first device management apparatus provided in an embodiment of the present specification. As shown in FIG. 5, the apparatus includes:

a sending module 502 configured for sending, in response to a borrow and return request for a device to be managed submitted by a user, an unlocking instruction to an electromagnetic lock configured for a device management cabinet, wherein the electromagnetic lock unlocks the device management cabinet in response to the unlocking instruction;

a receiving module 504 configured for receiving charging state information of a target device storage unit that is returned by the device management cabinet, wherein the target device storage unit is at least one of a plurality of device storage units in the device management cabinet, and the device to be managed is stored in the target device storage unit;

an acquisition module 506 configured for receiving lock state data of the device management cabinet that is sent by the electromagnetic lock, and acquiring electric quantity state information of the device to be managed; and a generation module 508 configured for generating borrow and return information of the device to be managed according to the charging state information, the electric quantity state information and the lock state data.

Optionally, the acquisition module 506 is further configured for:

acquiring the electric quantity state information of the device to be managed that is returned by a cloud service platform, wherein the electric quantity state information is sent to the cloud service platform by the device to be managed.

Optionally, the device management apparatus further includes an evaluation module configured for:

evaluating at least one device to be managed in the device management cabinet that meets a borrow condition, determining a device storage unit in which the at least one device to be managed is located, and establishing a first Bluetooth communication link with the device storage unit;

evaluating at least one device storage unit in the device management cabinet that meets a return condition for the device to be managed, and establishing a second Bluetooth communication link with the at least one device storage unit; and establishing a third Bluetooth communication link with the electromagnetic lock, wherein the first Bluetooth communication link, the second Bluetooth communication link and the third Bluetooth communication link serve as a Bluetooth main link between the client and the device management cabinet.

Optionally, the receiving module 504 is further configured for:
  receiving the charging state information of the target device storage unit that is returned by the device management cabinet through the first Bluetooth communication link or the second Bluetooth communication link;
Correspondingly, the acquisition module 506 is further configured for:
  receiving the lock state data of the device management cabinet that is sent by the electromagnetic lock through the third Bluetooth communication link.
Optionally, the sending module 502 is further configured for:
  sending, in response to a borrow request for the device to be managed submitted by the user, the unlocking instruction to the electromagnetic lock configured for the device management cabinet, and disconnecting the second Bluetooth communication link with the at least one device storage unit; or
  sending, in response to a return request for the device to be managed submitted by the user, the unlocking instruction to the electromagnetic lock configured for the device management cabinet, and disconnecting the first Bluetooth communication link established with the device storage unit.
Optionally, the device management apparatus further includes a sampling module configured for:
  sampling through the Bluetooth main link according to a preset data sampling interval to acquire charging state information of respective device storage units in the device management cabinet, charging state information of a device to be managed in the respective device storage units, and lock state data of the electromagnetic lock, in a case that the device management cabinet is in a locked state;
  determining whether an acquisition result of the charging state information of the respective device storage units, the charging state information of the device to be managed in the respective device storage units, and the lock state data of the electromagnetic lock meets a preset acquisition condition; and
  disconnecting the Bluetooth main link, and acquiring, through a Bluetooth auxiliary link, charging state information of the respective device storage units in the device management cabinet, charging state information of the device to be managed in the respective device storage units, and lock state data of the electromagnetic lock, if the acquisition result of the charging state information of the respective device storage units, the charging state information of the device to be managed in the respective device storage units, and the lock state data of the electromagnetic lock does not meet the preset acquisition condition.
Optionally, the device management apparatus further includes an establishment module configured for:
  establishing a fourth Bluetooth communication link between the target device to be managed and the respective device storage units in the device management cabinet, and establishing a fifth Bluetooth communication link between the target device to be managed and the electromagnetic lock, the fourth Bluetooth communication link, the fifth Bluetooth communication link, a communication link between the target device to be managed and the cloud service platform, and a communication link between the cloud service platform and the client together forming the Bluetooth auxiliary link.
Optionally, the sampling module is further configured for:
  acquiring, through the communication link between the cloud service platform and the client, the charging state information of the respective device storage units in the device management cabinet, the charging state information of the device to be managed in the respective device storage units, and lock the state data of the electromagnetic lock;
  wherein the charging state information of the respective device storage units is transmitted to the target device to be managed by the respective device storage units through the fourth Bluetooth communication link, the lock state data is sent to the target device to be managed by the electromagnetic lock through the fifth Bluetooth communication link, and the target device to be managed sends the charging state information of the respective device storage units in the device management cabinet, the charging state information of the device to be managed in the respective device storage units, and the lock state data of the electromagnetic lock to the client through the communication link with the cloud service platform and the communication link between the cloud service platform and the client.
Optionally, the establishment module is further configured for:
  determining an electric quantity of a device to be managed in the respective device storage unit sin the device management cabinet, and taking a device to be managed that has an electric quantity lower than a preset electric quantity threshold as the target device to be managed; and
  establishing the fourth Bluetooth communication link between the target device to be managed and the respective device storage unit in the device management cabinet.
Optionally, the device management apparatus further includes a recognition module configured for:
  calling an image collection component to collect a face image of the user and performing identity recognition on the user based on a collection result; and
  executing the step of sending the unlocking instruction to the electromagnetic lock configured for the device management cabinet, in a case of determining, according to an identity recognition result, that the user meets a borrow and return condition.
Optionally, the device management apparatus further includes a determination module configured for:
  acquiring login information of the user associated with the client, and executing the step of sending the unlocking instruction to the electromagnetic lock configured for the device management cabinet, in a case of determining, according to the login information, that the user meets a borrow and return condition.
Optionally, the generation module is further configured for:
  comparing the charging state information with the electric quantity state information, in a case of determining, according to the lock state data, that the device management cabinet is in the locked state; and
  generating borrow information or return information of the device to be managed in a case of a consistent comparison result.

Optionally, the generation module is further configured for:

acquiring acceleration data of the device to be managed, in a case of determining, according to the lock state data, that the device management cabinet is in the locked state;

comparing the charging state information with the electric quantity state information, in a case of determining, according to the acceleration data, that the device to be managed is in a static state; and generating return information of the device to be managed in a case of a consistent comparison result.

Described above is a schematic solution of the first device management apparatus in the embodiment. It should be noted that the technical solution of the first device management apparatus and the technical solution of the first device management method belong to the same concept. For any details not detailed in the technical solution of the first device management apparatus, reference may be made to the description of the technical solution of the first device management method.

Figure 6:
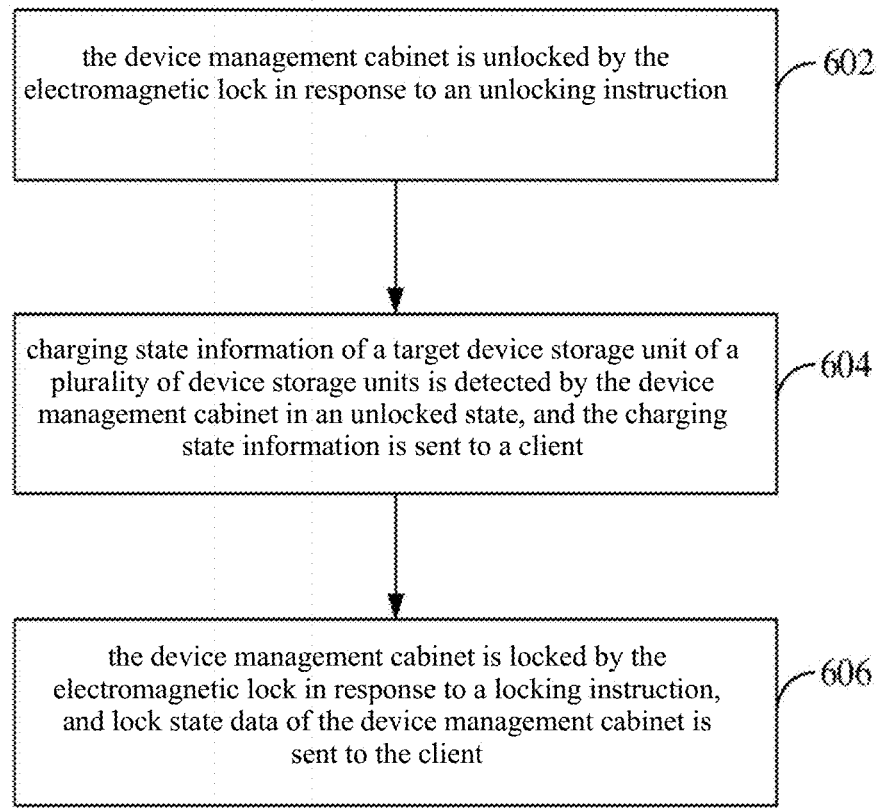
FIG. 6 is a flow chart of a second device management method provided in an embodiment of the present specification.

FIG. 6 shows a flow chart of a second device management method provided according to an embodiment of the present specification. The second device management method, applied to a device management cabinet including an electromagnetic lock, specifically includes the following steps.

At step S602, the device management cabinet is unlocked by the electromagnetic lock in response to an unlocking instruction.

At step S604, charging state information of a target device storage unit of a plurality of device storage units is detected by the device management cabinet in an unlocked state, and the charging state information is sent to a client.

At step S606, the device management cabinet is locked by the electromagnetic lock in response to a locking instruction, and lock state data of the device management cabinet is sent to the client, wherein the client acquires electric quantity state information of a device to be managed, and generates borrow and return information of the device to be managed according to the charging state information, the electric quantity state information and the lock state data, and the device to be managed is stored in the target device storage unit.

The device management method provided in the embodiment of the present specification is applied to the device management cabinet, and a user may send a borrow and return request for a device to be managed to the device management cabinet through the client.

Specifically, the device to be managed is a digital terminal on which device management needs to be performed, including, but not limited to, a handheld terminal, a personal digital assistant, a handheld cash register, a barcode scanning gun, or the like that are widely used in industries such as express delivery/logistics/supermarket/intelligent manufacturing. The device management includes, but is not limited to, borrow and return management, charging, state data statistics, fault reporting, statistical analysis of usage, or the like.

The client includes, but is not limited to, a mobile computer, a mobile computing device, or a face recognition device, wherein the mobile computing device includes, but is not limited to, a smart phone, a tablet computer, a personal digital assistant, a laptop computer, a notebook computer, a netbook, etc., a mobile phone (e.g., a smart phone), a wearable computing device (e.g., a smart watch, smart glasses, etc.), or other types of computing devices, or a stationary computing device such as a desktop computer or PC.

In the embodiment of the present specification, the device management cabinet includes a plurality of device storage units, each device storage unit may be used to store one or at least two devices to be managed, and each device storage unit is configured with a charging cable that may be used to charge the device(s) to be managed. After a user places a device to be managed in the device storage unit, the charging cable needs to be inserted into the device to be managed, so as to ensure that the device to be managed enters a charging state. When the user takes out the device to be managed from the device storage unit, the charging cable within the device storage unit needs to be disconnected from the device to be managed. Therefore, when generating borrow and return information of the device to be managed, the client may determine whether the device to be managed is successfully returned, or whether it is successfully borrowed, according to charging state information of the device to be managed and the device storage unit.

Additionally, each device management cabinet is configured with one electromagnetic lock that may be used to control opening/closing of the device management cabinet, and a device storage unit and the electromagnetic lock in the device management cabinet may perform data transmission with the client through Bluetooth.

Specifically, in a case that the user has a borrow or return demand for a device to be managed, the user may send an unlocking instruction to the electromagnetic lock through the client, and the client may first perform an identity authentication on the user prior to sending the unlocking instruction, and send the unlocking instruction to the electromagnetic lock in a case that the identity authentication is passed, so that the electromagnetic lock performs an unlocking operation on the device management cabinet. After the device management cabinet is successfully unlocked, the user can borrow a device to be managed from any one device storage unit in the device management cabinet, or place a device to be managed that has been borrowed in an idle device storage unit in the device management cabinet, so as to achieve return of the device to be managed.

In the unlocked state, the device management cabinet may detect charging state information of each device storage unit, for example, time information on starting charging or disconnecting charging (a time point of starting or stopping charging for a device to be managed), and send the information to the client. Additionally, after the user successfully takes out the device to be managed from the device storage unit, or successfully places the device to be managed in the device storage unit, a locking instruction may be sent to the electromagnetic lock through the client, and the electromagnetic lock performs a locking operation on the device management cabinet in response to the locking instruction, and sends lock state data of the device management cabinet to the client.

After receiving the charging state information of the device storage unit and the lock state data of the electromagnetic lock, the client may further acquire charging state information of the device to be managed, so as to generate borrow or return information of the device to be managed according to the information, wherein the charging state information of the device to be managed is sent to the client by the device to be managed.

In practical applications, if the client used by the user is a mobile computer or a mobile computing device (e.g., a smart phone), the user may implement borrow and return operations on the device to be managed through an application carried in the mobile computer or the mobile computing device. When the client performs an identity authentication on the user, the identity authentication may be performed on the user through login information of the user in the application. If the client used by the user is a face recognition device (e.g., a face recognition PAD), the identity authentication may be performed on the user by means of face recognition, which may be specifically determined according to actual needs, and is not limited here.

Additionally, the device management system provided in the embodiment of the present specification further includes a cloud service platform. The electric quantity state information of the device to be managed that is used when the client generates the borrow and return information of the device to be managed may be initiatively sent to the client by the device to be managed through the cloud service platform.

In the embodiment of the present specification, the device management cabinet is utilized to achieve the storage, receipt, return, charging and other daily digital managements of the device to be managed, so as to avoid waste of resources caused by loss of the device to be managed, and be beneficial to improving the utilization rate of the device to be managed. Additionally, according to the received charging state information of the target device storage unit, electric quantity state information of the device to be managed and lock state data of the device management cabinet, the client generates the borrow and return information of the device to be managed, which is beneficial to ensuring the accuracy of a generation result of the borrow and return information.

Figure 7:
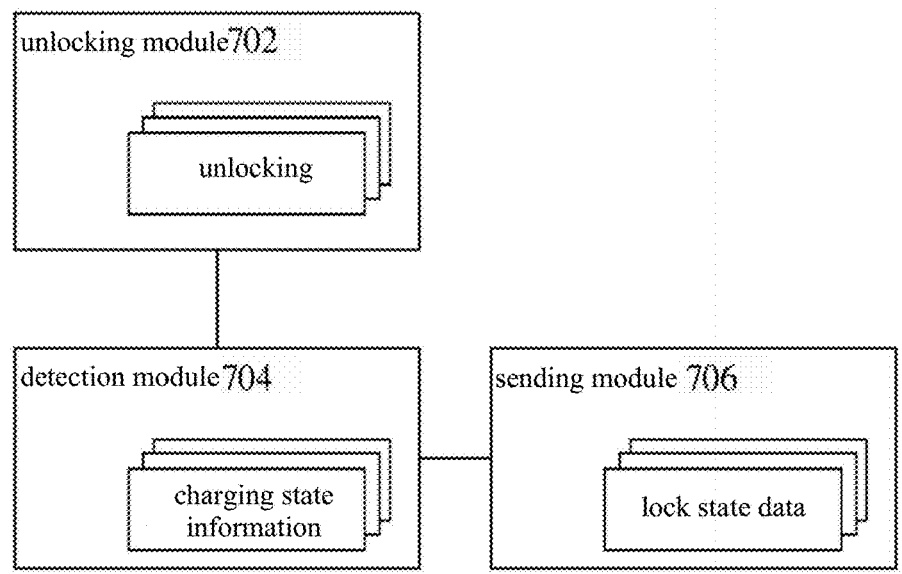
FIG. 7 is a structural schematic diagram of a second device management apparatus provided in an embodiment of the present specification.

Corresponding to the above method embodiment, the present specification further provides an embodiment of a device management apparatus, and FIG. 7 shows a structural schematic diagram of a second device management apparatus provided in an embodiment of the present specification. As shown in FIG. 7, the apparatus includes:
- an unlocking module 702 configured to enable unlocking the device management cabinet by the electromagnetic lock in response to an unlocking instruction;
- a detection module 704 configured to enable detecting, by the device management cabinet in an unlocked state, charging state information of a target device storage unit of a plurality of device storage units, and sending the charging state information to a client; and
- a sending module 706 configured to enable locking the device management cabinet by the electromagnetic lock in response to a locking instruction, and sends lock state data of the device management cabinet to the client, wherein the client acquires electric quantity state information of a device to be managed, and generates borrow and return information of the device to be managed according to the charging state information, the electric quantity state information and the lock state data, and the device to be managed is stored in the target device storage unit.

Described above is a schematic solution of the second device management apparatus in the embodiment. It should be noted that the technical solution of the second device management apparatus and the technical solution of the second device management method belong to the same concept. For any details not detailed in the technical solution of the second device management apparatus, reference may be made to the description of the technical solution of the second device management method.

Figure 8:
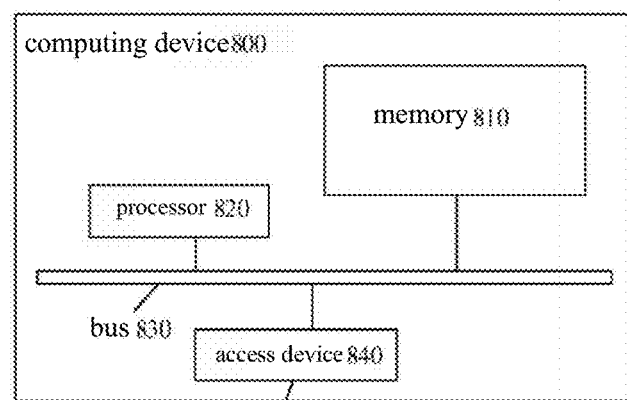
FIG. 8 is a structural block diagram of a computing device provided in an embodiment of the present specification.
Figure 8:
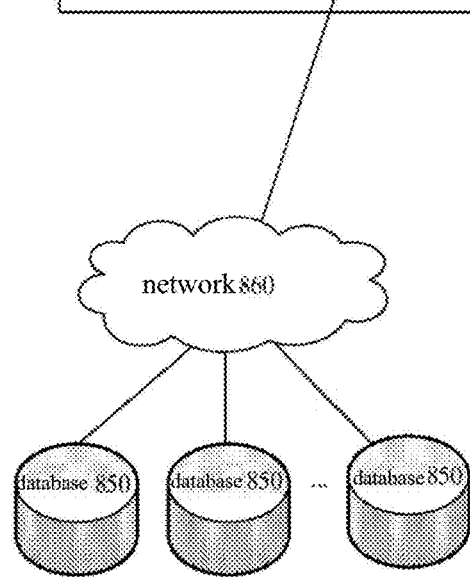

FIG. 8 shows a structural block diagram of a computing device 800 provided according to an embodiment of the present specification. Parts of this computing device 800 include, but are not limited to, a memory 810 and a processor 820. Processor 820 and memory 810 are connected through a bus 830, and a database 850 is used for saving data.

Computing device 800 further includes an access device 840 that enables computing device 800 to communicate via one or more networks 860. Examples of these networks include a public switched telephone network (PSTN), a local area network (LAN), a wide area network (WAN), a personal area network (PAN), or a combination of communication networks such as the Internet. Access device 940 may include one or more of any types of wired or wireless network interfaces (e.g., a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, etc.

In an embodiment of the present specification, the above parts of computing device 800 and other parts not shown in FIG. 8 may also be connected to each other through, for example, a bus. It should be understood that the structural block diagram of the computing device shown in FIG. 8 is for illustrative purposes only and does not limit the scope of the present specification. Those skilled in the art may add or replace other parts as needed.

Computing device 800 may be any type of stationary or mobile computing device, including a mobile computer or mobile computing device (e.g., a tablet computer, a personal digital assistant, a laptop computer, a notebook computer, a netbook, etc.), a mobile phone (e.g., a smart phone), a wearable computing device (e.g., a smart watch, smart glasses, etc.), or other types of computing devices, or a stationary computing device such as a desktop computer or PC. Computing device 800 may also be a mobile or stationary server.

Processor 820 is used for executing computer-executable instructions as below that, when executed by the processor, implement the steps of the above device management methods.

Described above is a schematic solution of the computing device in this embodiment. It should be noted that the technical solution of the computing device and the technical solution of the above device management methods belong to the same concept. For any details not detailed in the technical solution of the computing device, reference may be made to the description of the technical solution of the above device management methods.

An embodiment of the present specification further provides a computer-readable storage medium that stores computer-executable instructions that, when executed by a processor, implement the steps of the above device management methods.

Described above is a schematic solution of the computer-readable storage medium in this embodiment. It should be noted that the technical solution of the storage medium and the technical solution of the above device management methods belong to the same concept. For any details not detailed in the technical solution of the storage medium, reference may be made to the description of the technical solution of the above device management methods.

An embodiment of the present specification further provides a computer program, which, when executed in a computer, causes the computer to execute the steps of the above device management methods.

Described above is a schematic solution of the computer program in this embodiment. It should be noted that the technical solution of the computer program and the technical solution of the above device management methods belong to the same concept. For any details not detailed in the technical solution of the computer program, reference may be made to the description of the technical solution of the above device management methods.

Described above are particular embodiments of the present specification. Other embodiments are within the scope of the appended claims. In some cases, actions or steps recorded in the claims may be executed in a different order than in the embodiments, and may still achieve desired results. Additionally, processes depicted in the drawings do not necessarily require a particular or consecutive order as shown to achieve desired results. In some implementations, multitasking and parallel processing are also possible or may be advantageous.

The computer instructions include computer program codes, which may be in a form of source code or object code, an executable file, or some intermediate form. The computer-readable medium may include: any entity or apparatus capable of carrying the computer program code, a recording medium, a USB flash drive, a portable hard drive, a magnetic disc, an optical disc, a computer memory, a read-only memory (ROM), a random-access memory (RAM), an electrical carrier signal, a telecommunications signal, and a software distribution medium. It should be noted that content contained in the computer-readable medium may be appropriately increased or decreased according to the requirements of legislation and patent practice in a jurisdiction. For example, in some jurisdictions, according to legislation and patent practice, a computer-readable medium does not include an electrical carrier signal or a telecommunication signal.

It should be noted that for the convenience of description, the method embodiments described precedingly are all expressed as combinations of a series of actions. However, those skilled in the art should be aware that the embodiments of the present specification are not limited by the described action orders, because according to the embodiments of the present specification, certain steps may proceed in other sequences or at the same time. Furthermore, those skilled in the art should also be aware that the embodiments described in the specification are all preferred embodiments, and the actions and modules involved are not all definitely necessary for the embodiments of the present specification.

In the above embodiments, different focuses are put on their respective descriptions. For parts not detailed in a certain embodiment, reference may be made to the relevant descriptions of other embodiments.

The preferred embodiments of the present specification as disclosed above are merely used to help elaborate the present specification. The optional embodiments neither exhaustively recite all the details, nor limit the disclosure to the specific implementations as described. Obviously, according to the content of the embodiments of the present specification, many modifications and variations may be conducted. These embodiments are selected and specifically described in the present specification in order to better explain the principles and practical applications of the embodiments of the present specification, such that those skilled in the art can well understand and utilize the present specification. The present specification is limited only by the claims and their entire scope and equivalents.

What is claimed is:

1. A device management system, comprising:
   a device management cabinet and a client, wherein the device management cabinet comprises an electromagnetic lock, and the device management cabinet, the electromagnetic lock and the client are in communication connection with each other through Bluetooth;
   the electromagnetic lock is configured to unlock or lock the device management cabinet in response to an unlocking instruction or a locking instruction, and send lock state data of the device management cabinet to the client;
   the device management cabinet is configured to detect, in an unlocked state, charging state information of a target device storage unit of a plurality of device storage units, and send the charging state information to the client; and
   the client is configured to acquire electric quantity state information of a device to be managed, and generate borrow and return information of the device to be managed according to the charging state information, the electric quantity state information, and the lock state data, wherein the device to be managed is stored in the target device storage unit.

2. A device management method, applied to a client, comprising:
   sending, in response to a borrow and return request for a device to be managed submitted by a user, an unlocking instruction to an electromagnetic lock configured for a device management cabinet, wherein the electromagnetic lock unlocks the device management cabinet in response to the unlocking instruction;
   receiving charging state information of a target device storage unit that is returned by the device management cabinet, wherein the target device storage unit is at least one of a plurality of device storage units in the device management cabinet, and the device to be managed is stored in the target device storage unit;
   receiving lock state data of the device management cabinet that is sent by the electromagnetic lock, and acquiring electric quantity state information of the device to be managed; and
   generating, according to the charging state information, the electric quantity state information and the lock state data, borrow and return information of the device to be managed.

3. The device management method according to claim 2, wherein acquiring the electric quantity state information of the device to be managed comprises:
   acquiring the electric quantity state information of the device to be managed that is returned by a cloud service platform, wherein the electric quantity state information is sent by the device to be managed to the cloud service platform.

4. The device management method according to claim 2, before sending, in response to the borrow and return request for the device to be managed submitted by the user, the unlocking instruction to the electromagnetic lock configured for the device management cabinet, the method further comprising:
   evaluating at least one device to be managed in the device management cabinet that meets a borrow condition, determining a device storage unit in which the at least one device to be managed is located, and establishing a first Bluetooth communication link with the device storage unit;

evaluating at least one device storage unit in the device management cabinet that meets a return condition for the device to be managed, and establishing a second Bluetooth communication link with the at least one device storage unit; and establishing a third Bluetooth communication link with the electromagnetic lock, wherein the first Bluetooth communication link, the second Bluetooth communication link, and the third Bluetooth communication link serve as a Bluetooth main link between the client and the device management cabinet.

5. The device management method according to claim 4, wherein receiving the charging state information of the target device storage unit that is returned by the device management cabinet comprises:

receiving the charging state information of the target device storage unit that is returned by the device management cabinet through the first Bluetooth communication link or the second Bluetooth communication link; and correspondingly, receiving the lock state data of the device management cabinet that is sent by the electromagnetic lock comprises:

receiving the lock state data of the device management cabinet that is sent by the electromagnetic lock through the third Bluetooth communication link.

6. The device management method according to claim 4, wherein sending, in response to the borrow and return request for the device to be managed submitted by the user, the unlocking instruction to the electromagnetic lock configured for the device management cabinet comprises:

sending, in response to a borrow request for the device to be managed submitted by the user, the unlocking instruction to the electromagnetic lock configured for the device management cabinet, and disconnecting the second Bluetooth communication link with the at least one device storage unit; or sending, in response to a return request for the device to be managed submitted by the user, the unlocking instruction to the electromagnetic lock configured for the device management cabinet, and disconnecting the first Bluetooth communication link established with the device storage unit.

7. The device management method according to claim 4, further comprising:

sampling through the Bluetooth main link according to a preset data sampling interval to acquire charging state information of respective device storage units in the device management cabinet, charging state information of a device to be managed in the respective device storage units, and lock state data of the electromagnetic lock, in a case that the device management cabinet is in a locked state;

determining whether an acquisition result of the charging state information of the respective device storage units, the charging state information of the device to be managed in the respective device storage units, and the lock state data of the electromagnetic lock meets a preset acquisition condition; and disconnecting the Bluetooth main link, and acquiring, through a Bluetooth auxiliary link, charging state information of the respective device storage units in the device management cabinet, charging state information of the device to be managed in the respective device storage units, and lock state data of the electromagnetic lock, if the acquisition result of the charging state information of the respective device storage units, the charging state information of the device to be managed in the respective device storage units, and the lock state data of the electromagnetic lock does not meet the preset acquisition condition.

8. The device management method according to claim 7, further comprising:

establishing a fourth Bluetooth communication link between the target device to be managed and the respective device storage units in the device management cabinet, and establishing a fifth Bluetooth communication link between the target device to be managed and the electromagnetic lock, the fourth Bluetooth communication link, the fifth Bluetooth communication link, a communication link between the target device to be managed and the cloud service platform, and a communication link between the cloud service platform and the client together forming the Bluetooth auxiliary link.

9. The device management method according to claim 8, wherein acquiring, through the Bluetooth auxiliary link, the charging state information of the respective device storage units in the device management cabinet, the charging state information of the device to be managed in the respective device storage units, and the lock state data of the electromagnetic lock comprises:

acquiring, through the communication link between the cloud service platform and the client, the charging state information of the respective device storage units in the device management cabinet, the charging state information of the device to be managed in the respective device storage units, and the lock state data of the electromagnetic lock;

wherein the charging state information of the respective device storage units is transmitted to the target device to be managed by the respective device storage units through the fourth Bluetooth communication link, the lock state data is sent to the target device to be managed by the electromagnetic lock through the fifth Bluetooth communication link, and the target device to be managed sends the charging state information of the respective device storage units in the device management cabinet, the charging state information of the device to be managed in the respective device storage units, and the lock state data of the electromagnetic lock to the client through the communication link with the cloud service platform and the communication link between the cloud service platform and the client.

10. The device management method according to claim 8- or 9, wherein establishing the fourth Bluetooth communication link between the target device to be managed and the respective device storage units in the device management cabinet comprises:

determining an electric quantity of a device to be managed in the respective device storage units in the device management cabinet, and taking a device to be managed that has an electric quantity lower than a preset electric quantity threshold as the target device to be managed; and establishing the fourth Bluetooth communication link between the target device to be managed and the respective device storage units in the device management cabinet.

11. The device management method according to claim 2, before sending the unlocking instruction to the electromagnetic lock configured for the device management cabinet, the method further comprising:

calling an image collection component to collect a face image of the user and performing identity recognition on the user based on a collection result; and executing the step of sending the unlocking instruction to the electromagnetic lock configured for the device management cabinet, in a case of determining, according to an identity recognition result, that the user meets a borrow and return condition.

12. The device management method according to claim 2, before sending the unlocking instruction to the electromagnetic lock configured for the device management cabinet, the method further comprising:

acquiring login information of the user associated with the client, and executing the step of sending the unlocking instruction to the electromagnetic lock configured for the device management cabinet, in a case of determining, according to the login information, that the user meets a borrow and return condition.

13. The device management method according to claim 2, wherein generating, according to the charging state information, the electric quantity state information and the lock state data, the borrow and return information of the device to be managed comprises:

comparing the charging state information with the electric quantity state information, in a case of determining, according to the lock state data, that the device management cabinet is in the locked state; and generating borrow information or return information of the device to be managed in a case of a consistent comparison result.

14. The device management method according to claim 2, generating, according to the charging state information, the electric quantity state information and the lock state data, the borrow and return information of the device to be managed comprises:

acquiring acceleration data of the device to be managed, in a case of determining, according to the lock state data, that the device management cabinet is in the locked state;

comparing the charging state information with the electric quantity state information, in a case of determining, according to the acceleration data, that the device to be managed is in a static state; and generating return information of the device to be managed in a case of a consistent comparison result.

15. A device management method, applied to a device management cabinet with an electromagnetic lock, comprising:

unlocking the device management cabinet by the electromagnetic lock in response to an unlocking instruction;

detecting, by the device management cabinet in an unlocked state, charging state information of a target device storage unit of a plurality of device storage units, and sending the charging state information to a client; and locking the device management cabinet by the electromagnetic lock in response to a locking instruction, and sending lock state data of the device management cabinet to the client, wherein the client acquires electric quantity state information of a device to be managed, and generates borrow and return information of the device to be managed according to the charging state information, the electric quantity state information and the lock state data, and the device to be managed is stored in the target device storage unit.

16. The device management method according to claim 3, before sending, in response to the borrow and return request for the device to be managed submitted by the user, the unlocking instruction to the electromagnetic lock configured for the device management cabinet, the method further comprising:

evaluating at least one device to be managed in the device management cabinet that meets a borrow condition, determining a device storage unit in which the at least one device to be managed is located, and establishing a first Bluetooth communication link with the device storage unit;

evaluating at least one device storage unit in the device management cabinet that meets a return condition for the device to be managed, and establishing a second Bluetooth communication link with the at least one device storage unit; and establishing a third Bluetooth communication link with the electromagnetic lock, wherein the first Bluetooth communication link, the second Bluetooth communication link and the third Bluetooth communication link serve as a Bluetooth main link between the client and the device management cabinet.

17. The device management method according to claim 5, wherein sending, in response to the borrow and return request for the device to be managed submitted by the user, the unlocking instruction to the electromagnetic lock configured for the device management cabinet comprises:

sending, in response to a borrow request for the device to be managed submitted by the user, the unlocking instruction to the electromagnetic lock configured for the device management cabinet, and disconnecting the second Bluetooth communication link with the at least one device storage unit; or sending, in response to a return request for the device to be managed submitted by the user, the unlocking instruction to the electromagnetic lock configured for the device management cabinet, and disconnecting the first Bluetooth communication link established with the device storage unit.

18. The device management method according to claim 5, further comprising:

sampling through the Bluetooth main link according to a preset data sampling interval to acquire charging state information of respective device storage units in the device management cabinet, charging state information of a device to be managed in the respective device storage units, and lock state data of the electromagnetic lock, in a case that the device management cabinet is in a locked state;

determining whether an acquisition result of the charging state information of the respective device storage units, the charging state information of the device to be managed in the respective device storage units, and the lock state data of the electromagnetic lock meets a preset acquisition condition; and disconnecting the Bluetooth main link, and acquiring, through a Bluetooth auxiliary link, charging state information of the respective device storage units in the device management cabinet, charging state information of the device to be managed in the respective device storage units, and lock state data of the electromagnetic lock, if the acquisition result of the charging state information of the respective device storage units, the charging state information of the device to be managed in the respective device storage units, and the lock state data of the electromagnetic lock does not meet the preset acquisition condition.

19. The device management method according to claim 3, before sending the unlocking instruction to the electromagnetic lock configured for the device management cabinet, the method further comprising:
- calling an image collection component to collect a face image of the user and performing identity recognition on the user based on a collection result; and
- executing the step of sending the unlocking instruction to the electromagnetic lock configured for the device management cabinet, in a case of determining, according to an identity recognition result, that the user meets a borrow and return condition.

20. The device management method according to claim 3, before sending the unlocking instruction to the electromagnetic lock configured for the device management cabinet, the method further comprising:
- acquiring login information of the user associated with the client, and executing the step of sending the unlocking instruction to the electromagnetic lock configured for the device management cabinet, in a case of determining, according to the login information, that the user meets a borrow and return condition.

* * * * *